(12) United States Patent
Maucher et al.

(10) Patent No.: US 12,523,260 B2
(45) Date of Patent: Jan. 13, 2026

(54) COUNTER TRACK JOINT (71) Applicant: GKN Driveline International GmbH, Lohmar (DE)

(72) Inventors: Stephan Maucher, Siegburg (DE); Thomas Weckerling, Sankt Augustin (DE); Rolf Cremerius, Sankt Augustin (DE); Ida Benner, Troisdorf (DE); Anna Gremmelmaier, Sankt Augustin (DE); Hans-Jürgen Post, Bonn (DE)

(73) Assignee: GKN Driveline International GmbH, Lohmar (DE)

( * ) Notice: Subject to any disclaimer, the term of this patent is extended or adjusted under 35 U.S.C. 154(b) by 332 days.

(21) Appl. No.: 18/256,672

(22) PCT Filed: Dec. 11, 2020

(86) PCT No.: PCT/EP2020/085798
§ 371 (c)(1),
(2) Date: Jun. 9, 2023

(87) PCT Pub. No.: WO2022/122170
PCT Pub. Date: Jun. 16, 2022

(65) Prior Publication Data
US 2024/0035520 A1 Feb. 1, 2024

(51) Int. Cl.
F16D 3/224 (2011.01)
F16D 3/223 (2011.01)

(52) U.S. Cl.
CPC .... F16D 3/224 (2013.01); *F16D 2003/22303* (2013.01); *F16D 2003/22306* (2013.01);
(Continued)

(58) Field of Classification Search
CPC .......... F16D 3/224; F16D 2003/22303; F16D 2003/22306; F16D 2003/22309;
(Continued)

(56) References Cited

U.S. PATENT DOCUMENTS 6,224,490 B1 5/2001 Iihara et al.
9,133,888 B2 * 9/2015 Gremmelmaier ....... F16D 3/223
(Continued)

FOREIGN PATENT DOCUMENTS

DE 3132363 C1 1/1983
DE 10032853 A1 1/2002
(Continued)

OTHER PUBLICATIONS

International Search Report and Written Opinion for PCT/EP2020/085798 mailed Sep. 28, 2021 (14 pages; with English translation).

*Primary Examiner* — Greg Binda
(74) *Attorney, Agent, or Firm* — Reising Ethington P.C.

(57) ABSTRACT

A counter track joint comprises an outer joint part, an inner joint part, first pairs of tracks widening towards the opening side of the outer joint part when the counter track joint is aligned, and second pairs of tracks widening towards the connecting side of the outer joint part when the counter track joint is aligned; a ball in each of the first and second pairs of tracks; a ball cage having circumferentially distributed cage windows each receiving one of the balls, wherein one of the outer ball track group and the inner ball track group is hardened and hard machined, and the other of the outer ball track group and the inner ball track group is soft finished and subsequently hardened. A method of manufacturing a counter track joint is provided.

19 Claims, 8 Drawing Sheets

(52) U.S. Cl.
CPC .............. *F16D 2003/22309* (2013.01); *F16D 2250/003* (2013.01); *F16D 2250/0053* (2013.01); *F16D 2250/0084* (2013.01); *F16D 2300/10* (2013.01); *F16D 2300/12* (2013.01); *Y10S 464/906* (2013.01)

(58) Field of Classification Search
CPC ....... F16D 2250/003; F16D 2250/0053; F16D 2250/0084; F16D 2300/10; F16D 2300/12; Y10S 464/906
USPC ....................................................... 464/145
See application file for complete search history.

(56) References Cited

U.S. PATENT DOCUMENTS

| | | |
|---|---|---|
| 2002/0065138 A1 | 5/2002 | Johnson et al. |
| 2014/0206463 A1 | 7/2014 | Gremmelmaier et al. |

FOREIGN PATENT DOCUMENTS

| | | |
|---|---|---|
| DE | 10060120 A1 | 6/2002 |
| DE | 10209933 A1 | 10/2003 |
| DE | 102004018721 A1 | 4/2005 |
| DE | 102005042909 A1 | 3/2007 |
| DE | 102005063006 A1 | 4/2007 |
| DE | 102010035433 A1 | 3/2012 |
| DE | 102010051353 A1 | 5/2012 |
| JP | H1113780 A | 1/1999 |
| WO | 2013029655 A1 | 3/2013 |

\* cited by examiner

COUNTER TRACK JOINT

CROSS-REFERENCE TO RELATED APPLICATIONS

This application is a national stage of, and claims priority to, Patent Cooperation Treaty Application No. PCT/EP2020/085798, filed on Dec. 11, 2020, which application is hereby incorporated herein by reference in its entirety.

BACKGROUND

From DE 100 60 120 A1, a counter track joint is known with an outer joint part with curved outer tracks, an inner joint part with curved inner tracks, torque-transmitting balls received in track pairs of outer tracks and inner tracks, and a ball cage with cage windows in which the balls are held in a common plane. First outer tracks and first inner tracks form first track pairs whose first control angles open in a first axial direction and in which first balls are held. Second outer tracks and second inner tracks form second track pairs, the second control angles of which open in a second axial direction and in which second balls are held. The outer joint part and the inner joint part are axially displaceable relative to each other.

A counter track joint is known from WO 2013/029655 A1. First pairs of tracks open to the opening side when the joint is aligned, and second pairs of tracks open to the connecting side. The control angle of the first pairs of tracks is greater than the control angle of the second pairs of tracks. The center line of the first pairs of tracks of the outer joint part in the direction of the connection side runs radially inside and, in the direction of the opening side runs radially outside a reference circular arc.

A counter track joint is known from DE 102 09 933 A1 comprising an inner race with first inner race grooves and second inner race grooves, an outer race with first outer race grooves and second outer race grooves which form a pair with the first and second inner race grooves respectively, an annular cage arranged between the inner race and the outer race and has radial windows in which balls engaging in the race grooves are guided. The outer race of the counter track joint is a one-piece closed ring into which the outer race grooves are formed without cutting.

A constant velocity joint with an outer joint part, an inner joint part, torque transmitting balls and a cage is known from U.S. Pat. No. 6,224,490 B1. The outer joint part has a spherical inner face with running grooves. The inner joint part has a spherical outer face with running grooves, the number of which is equal to the number of running grooves in the outer joint part. The running grooves in the outer joint part and a lead-in chamfer on the outer joint part are produced by a plastic-forming machining process.

DE 10 2005 063 006 A1, an inner joint part for a constant velocity joint is known. The inner joint part has an outer spherical guiding face for guiding a ball cage and several circumferentially distributed ball tracks formed in the spherical guiding face for receiving torque-transmitting balls. The ball tracks each have a hard-machined first track portion for guiding the balls and a mechanically unmachined second track portion that does not provide a guiding function for the balls.

SUMMARY

The present disclosure relates to a constant velocity joint in the form of a counter track joint and a method of producing a counter track joint. The constant velocity joint which is cost-effective, has a high efficiency and a long service life, and is suitable for large articulation angles. A method for producing a counter track joint is also described.

According to the disclosure, a constant velocity joint in the form of a counter track joint is proposed, comprising: an outer joint part having a longitudinal axis, a connection side and an opening side, and first outer ball tracks and second outer ball tracks circumferentially distributed in an inner face of the outer joint part and forming an outer ball track group; an inner joint part having a longitudinal axis, and first inner ball tracks and second inner ball tracks circumferentially distributed in an outer face of the inner joint part and forming an inner ball track group; wherein the first outer ball tracks and the first inner ball tracks form first track pairs with each other which are at least partially curved and widen towards the opening side of the outer joint part, and wherein the second outer ball tracks and the second inner ball tracks form second track pairs with each other which are at least partially curved and widen towards the connection side of the outer joint part; a torque transmitting ball respectively in each first track pair and in each second track pair; a ball cage arranged between the outer joint part and the inner joint part and having a cage inner face, a cage outer face and circumferentially distributed cage windows each receiving at least one of the torque transmitting balls, the balls being held by the ball cage on a joint central plane with the longitudinal axes of the inner joint part and the outer joint part coaxially aligned; wherein the inner face of the outer joint part towards the connection side forms a support face against which the ball cage can be axially supported, including during assembly; wherein one of the outer ball track group and the inner ball track group is hard-machined, and the other one of the outer ball track group and the inner ball track group is soft-finished and hardened.

The counter track joint has the advantage that it can be manufactured at low cost due to the ball track group that is finish-machined before hardening. At the same time, due to the hardened and subsequently hard finish-machined ball track group, the supporting face of the outer joint part and the counter track shape, a good guiding and supporting function for the ball cage and thus high efficiency is provided.

In the context of the present disclosure, soft-finished includes that the desired ball track geometry is created exclusively by soft machining, i.e., is effected and completed before hardening. After hardening, no further geometry-changing machining of the ball tracks is provided, including no cutting machining being provided. The ball tracks can be finished by forming, for example by forging, hot forming, cold forming, stamping and/or hammering. Alternatively or in addition, the ball tracks can be machined, at least in intermediate steps, for example by milling, turning and/or grinding operations.

Furthermore, in the context of the present disclosure, hardened and hard-machined means that the respective ball track group is prefabricated with corresponding allowances before hardening and is finish-machined to the desired final geometry after hardening. The prefabrication can be carried out by cutting processes, such as turning or milling, and/or by non-cutting manufacturing processes, such as forming and/or forging or stamping. Finish-machining can be carried out by a cutting process, for example by grinding or turning. Herein, the allowance material of the respective faces provided for the intermediate product, which can be a few tenths of a millimetre, for example, is removed after hardening.

The ball tracks that have been hard-machined by grinding or turning, for example, can have a lower surface roughness than the soft-finished ball tracks, i.e., those ball tracks that are unmachined after hardening. The latter can optionally have a microstructure that is produced by shot peening carried out before hardening.

The first outer ball tracks and the second outer ball tracks can be designed such that, when viewed in cross-section, a two-point contact is respectively formed with the associated torque-transmitting ball. Alternatively or additionally, the first inner ball tracks and the second inner ball tracks can also be designed such that, when viewed in cross-section, a two-point contact is respectively formed with the associated torque-transmitting ball. A two-point contact can be created, for example, by a gothic or elliptical track shape when viewed in cross-section. The two-point contact, respectively two-point track, makes it possible to perform a self-centring measurement of the ball tracks. A circular track could alternatively be used.

Described herein are two possible embodiments that result from the assignment of the ball tracks finish-machined before or after hardening to the outer joint part or inner joint part. According to a first embodiment, the ball tracks that are soft finish-machined before hardening can be assigned to the outer joint part, while the hardened and subsequently hard-finished ball tracks are assigned to the inner joint part. According to a reverse alternative embodiment, the ball tracks that are soft finish-machined before hardening can be assigned to the inner joint part, while the hardened and subsequently hard finish-machined ball tracks are assigned to the outer joint part.

Some possible implementations are described below, relating to the first embodiment in which the ball tracks of the outer joint part are finish-machined before hardening and the ball tracks of the inner joint part are finish-machined after hardening. In the second embodiment, in which the soft-finished ball tracks are assigned to the inner joint part and the hard-finished ball tracks are assigned to the outer joint part, the features would be reversed accordingly.

According to an implementation, the inner face of the outer part can be hardened and remain mechanically unmachined after hardening. In other words, the geometry of the inner face is finished and/or completed before hardening. After hardening, no further geometry-changing machining of the inner face is provided, including no cutting processing being provided. The inner face of the outer part can be finish machined by forming, for example by forging, hot forming, stamping and/or hammering. Alternatively or in addition, the inner face of the outer part can be machined, at least in intermediate steps, for example by milling, turning and/or grinding operations.

The outer face of the inner joint part can be hardened and hard-machined after hardening. This means that the outer face of the inner part is prefabricated with the appropriate allowance before hardening and is finished to the desired final geometry after hardening. Prefabrication can be carried out by cutting machining processes, such as turning or milling, and/or by non-cutting processes, such as forming and/or forging. The finish-machining of the outer face can be carried out by cutting machining, for example by grinding or turning.

According to an implementation, the cage outer face of the ball cage may be soft finish machined, hardened and mechanically unmachined after hardening. Alternatively or additionally, the inner face of the cage may be soft finish machined, hardened and remain mechanically unmachined after hardening. Before hardening the cage, the cage outer face can be machined and/or produced at least in partial processes, in a cutting manner, for example by turning or grinding, and/or non-cutting, for example by forming. The same applies analogously to the machining of the inner face of the cage, which can be carried out by chipless and/or chip-removing processes.

According to an implementation, with the longitudinal axes of the outer joint part and the inner joint part aligned with each other, an outer radial clearance between the cage outer face and the inner face of the outer joint part and an inner radial clearance between the cage inner face and the outer face of the inner joint part may be of different sizes. Similarly, an outer total axial clearance formed between the cage outer face and the inner face of the outer joint part and an inner total axial clearance formed between the cage inner face and the outer face of the inner joint part may be different in size. When the outer ball track group is soft finished, the outer radial clearance, respectively outer total axial clearance, is preferably larger than the inner radial clearance, respectively the inner total axial clearance. If the inner ball track group is soft finished, the outer radial clearance, respectively outer total axial clearance, is preferably smaller than the inner radial clearance, respectively inner total axial clearance. The joint parts can further be configured such that when the inner joint part is positioned axially centrally in relation to the ball cage, the outer total axial clearance is divided asymmetrically into an outer axial clearance towards the opening side and an outer axial clearance towards the connection side. The axial play or clearance on the connection side is preferably smaller than the axial play or clearance on the opening side. This provides in an advantageous way that the inner joint part, when a shaft is pressed thereinto, can be supported axially against the supporting face of the outer joint part via the ball cage without the balls jamming in the ball tracks and/or coming into pressing contact with the ball tracks. The different configuration of the radial clearances and axial clearances contribute to a simple and cost-effective production, as a rough clearance is possible in one of four surface pairings.

The opposing faces of the outer joint part, the cage and the inner joint part can in principle be freely selected according to the requirements. For example, one, several, or all of the inner face of the outer joint part, the cage outer face, the cage inner face, and the outer face of the inner joint part can be spherical. Alternatively or additionally, said faces may have cylindrical, toroidal and/or conical sections. When using a spherical cage with a spherical outer face and inner face, these spherical faces may be arranged coaxially with respect to each other, i.e., the two face centers coincide. According to an alternative possibility, the spherical faces can also be axially offset from each other, that is, the two face centers of the inner and outer spherical cage faces have an axial distance (offset) from each other. The same applies analogously when using a spherical inner face of the outer part and/or spherical outer face of the inner part for these faces.

The first outer ball tracks form a first undercut towards the opening side, and the second outer ball tracks form a second undercut towards the opening side. In particular, the first undercut of the first ball tracks opening to the opening side is smaller than the second undercut of the second ball tracks opening to the connection side.

The above implementations refer to the embodiment in which the geometry of the ball tracks of the outer joint part is produced exclusively by soft machining and the ball tracks of the inner joint part are hard machined. It is understood that in the alternative embodiment, in which the ball tracks of the outer joint part are hard-machined and the geometry of the ball tracks of the inner joint part is produced exclusively by soft machining before hardening, the features are to be provided correspondingly in reverse.

According to an implementation, which applies to both of the above-mentioned embodiments, at least a partial number of the second outer ball tracks of the outer joint part can have, on the connection side, a pocket which is radially recessed with respect to a functional track section and into which the associated ball can enter radially when the joint is overflexed. This facilitates the assembly of the counter track joint.

According to a further implementation, which applies to both embodiments, the outer joint part and the inner joint part may be designed so as to be angularly movable relative to each other by a articulation angle (p) of up to a maximum of 30°, or up to a maximum of 25°. The first balls of the first pair of tracks form a first pitch circle diameter (PCDA), and the second balls of the second pair of tracks form a second pitch circle diameter (PCDB). The ratio of at least one of the first and second pitch circle diameters to the largest pitch circle diameter (PCDS) of the insertion opening of the inner joint part is can be smaller than 2.05 (PCDA/PCDS<2.05 and/or PCDB/PCDS<2.05). This design allows particularly high torques to be transmitted by the joint with relatively small articulation angles. Thus, this design is suitable for use in a non-steered rear axle, especially on the transmission side. However, applications with large articulation angles are also possible, for example for wheel-sided steered front axles. Here, the joint can be designed for articulation angles of more than 45°. Accordingly, the joint can also be designed with a ratio of ball pitch circle diameter to opening pitch circle diameter that deviates from the above, which can be between 1.5 and 3.0 (1.5<PCDA/PCDS<3.0 and/or 1.5<PCDB/PCDS<3.0). A ratio between the ball pitch circle diameter and the ball diameter can be between 2.5 and 4.5, for example.

The number of torque-transmitting balls and correspondingly the outer and inner ball tracks is preferably divisible by two and can be eight, although numbers deviating from this, such as 6 or 10, are also possible.

Further disclosed is a method for producing a constant velocity joint in the form of a counter track joint, comprising:
producing an outer joint part with a longitudinal axis, a connection side and an opening side, an inner face with a supporting face axially effective to the connection side, and with first outer ball tracks and second outer ball tracks which together form an outer ball track group;
producing an inner joint part having a longitudinal axis, an outer face, and first inner ball tracks and second inner ball tracks forming an inner ball track group;
producing a ball cage having a cage axis, a cage inner face, a cage outer face and cage windows circumferentially distributed about a cage axis;
inserting the inner joint part into the ball cage;
inserting the ball cage into the outer joint part;
turning the inner joint part relative to the outer joint part in such a way that the first inner ball tracks are opposite the first outer ball tracks and form first track pairs which, in an angular position of the joint, widen towards the opening side of the outer joint part, and the second inner ball tracks are opposite the second outer ball tracks and form second track pairs which, in the angular position of the joint, widen towards the connection side of the outer joint part;
inserting balls into the cage windows with the inner and outer joint parts angled relative to each other, wherein the first track pairs and the second track pairs respectively receive one of the torque transmitting balls, wherein with the longitudinal axes of the inner and outer joint parts coaxially aligned, the balls are held by the ball cage on a joint central plane;
wherein one of the outer ball track group and the inner ball track group are soft pre-machined, then hardened, and after hardening are finish-machined, for example by cutting machining; and
wherein the other of the outer ball track group and the inner ball track group is soft finish machined and then hardened, i.e., remains mechanically unmachined after hardening and/or is not being hard machined.

A counter track joint manufactured by the process has the same advantages as described above. It is understood that all product-related features are transferable to the method and, conversely, that all method-related features are transferable to the product.

According to a possible method implementation, the outer face of the cage and/or the inner face of the cage can be soft finished, such as by a forming process, and then hardened. After hardening, preferably no further geometry-forming and/or mechanical processing is provided.

The outer joint part and/or the inner joint part can, for example, be made of a heat-treatable steel or a case-hardening steel. The hardening of the ball tracks and optionally of the inner face of the outer joint part can be carried out, for example, by surface hardening, such as by inductive heating. Surface hardened steels, made of heat-treatable or case-hardening steel, provide a wear-free surface with a ductile core. This also applies analogously to the ball tracks and optionally the outer surface of the inner joint part, which can also be surface hardened. Alternatively, the inner joint part can also be case-hardened. Case hardening results in a decreasing hardness curve from the outer surface of the component in the direction of the core hardness.

According to a first possibility, the first and second outer ball tracks as well as the inner surface of the outer joint part can be soft finished, such as by a forming process, and thereafter the first and second outer ball tracks and optionally the inner surface of the outer joint part can be hardened. Accordingly, the first and second inner ball tracks and the outer face of the inner joint part can be soft pre-machined, then hardened, and after hardening, hard finished. According to a second possibility, the machining of the outer joint part and the inner joint part can be reversed.

For both possibilities, the outer face of the cage and the inner face of the outer joint part on the one hand, and the inner face of the cage and the outer face of the inner joint part on the other hand, can be manufactured such that, in the assembled and aligned state of the counter track joint, an outer radial gap between the ball cage and the outer joint part and an inner radial gap between the ball cage and the inner joint part are of different sizes, and/or in that an outer axial play or clearance between the ball cage and the outer joint part and an inner axial play or clearance between the ball cage and the inner joint part are of different sizes.

According to an implementation, the inner joint part can be manufactured such that a partial number of webs of the inner joint part have flattened regions or areas on both sides. In this way, a simplified assembly of the inner joint part into the ball cage is possible, wherein the shorter web of the inner joint part can be mounted into a window of the ball cage when the inner joint part is aligned with its longitudinal axis crossing the cage axis.

According to a further implementation, at least a partial number of the second outer ball tracks of the outer joint part can be produced on the connection side with a pocket that is radially recessed relative to a functional section, into which pocket the associated ball can enter radially when the joint is overflexed. This also contributes to an improved assembly.

BRIEF SUMMARY OF THE DRAWINGS

Example embodiments are explained below with reference to the drawing figures.

DESCRIPTION

FIGS. 1A to 7B, which are described together below, show a counter track joint 11 according to the disclosure. The counter track joint 11 comprises an outer joint part 12, an inner joint part 13, a plurality of torque-transmitting balls 14A, 14B, and a ball cage 15. A surrounding space 25 is formed between the spherical outer face 16 of the ball cage 15 and the spherical inner face 24 of the outer joint part 12. A surrounding space 27 is also formed between the spherical inner face 17 of the ball cage 15 and the spherical outer face 26 of the inner joint part 13. In the present embodiment, the surface centers M16 and M17 lie in a common joint center plane EM, although in a modified embodiment it is also possible for the surface centers M16 and M17 to respectively have an axial distance (offset) with respect to the joint center plane EM in opposite directions. The balls 14A, 14B are held in circumferentially distributed cage windows 18 in the ball cage 15 in the joint center plane EM. A longitudinal axis L12 is marked on the outer joint part 12 and a longitudinal axis L13 is marked on the inner joint part 13. The point of intersection of the longitudinal axes L12, L13 with the joint center plane EM forms the joint center M.

Figure 3C:
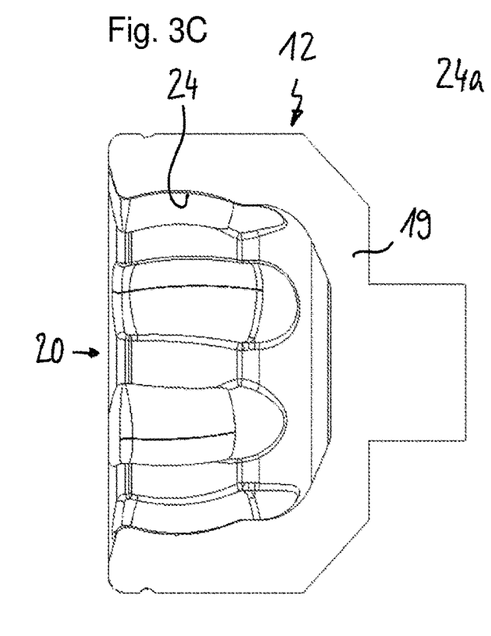
FIG. 3C shows the outer joint part of the first example counter track joint in a longitudinal section through a web area according to section line 3C-3C of FIG. 3B.
Figure 3D:
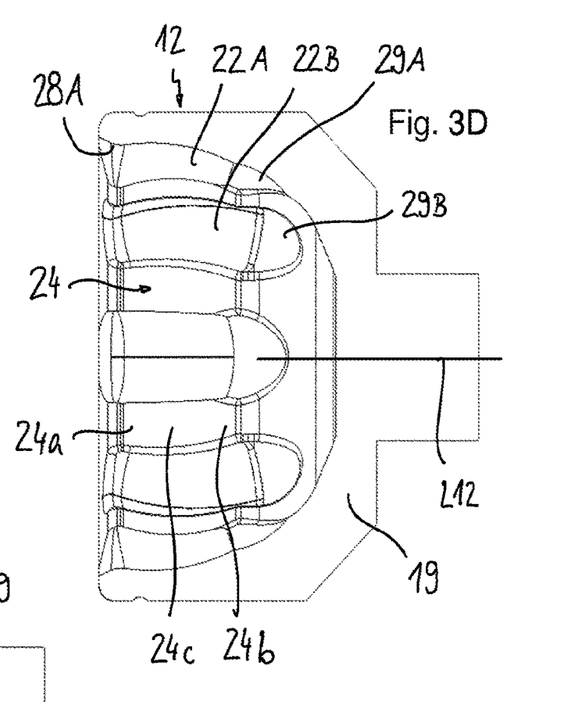
FIG. 3D shows the outer joint part of the first example counter track joint in a longitudinal section through a first outer ball track according to section line 3D-3D of FIG. 3B.
Figure 3E:
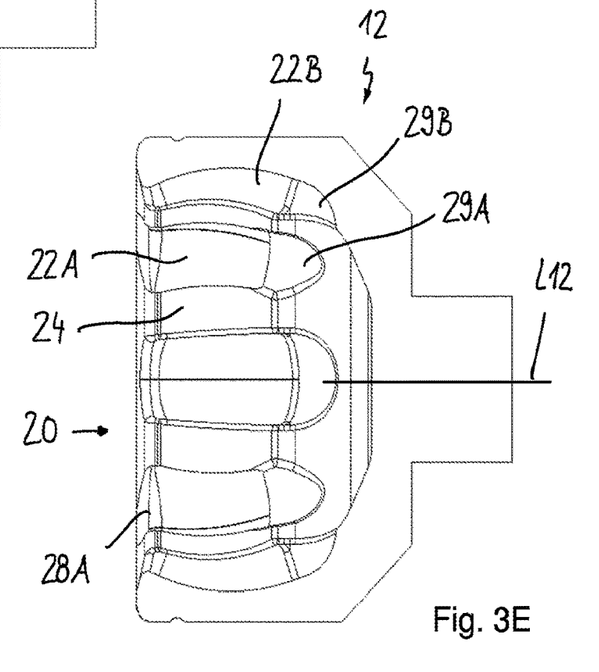
FIG. 3E shows the outer joint part of the first example counter track joint in a longitudinal section through a second outer ball track according to section line 3E-3E of FIG. 3B.
Figure 4A:
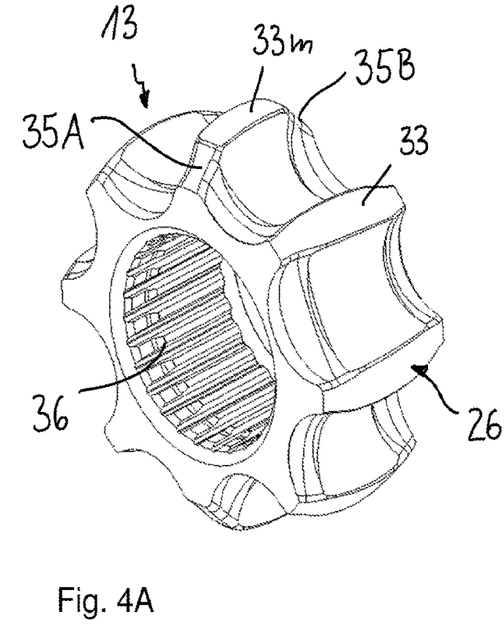
FIG. 4A shows the inner joint part of the first example counter track joint in a three-dimensional representation.
Figure 4B:
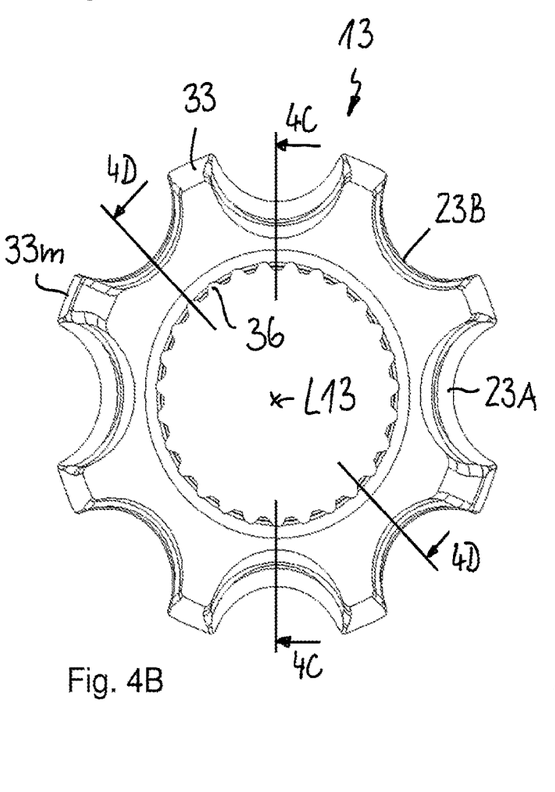
FIG. 4B shows the inner joint part of the first example counter track joint in an axial view.
Figure 4C:
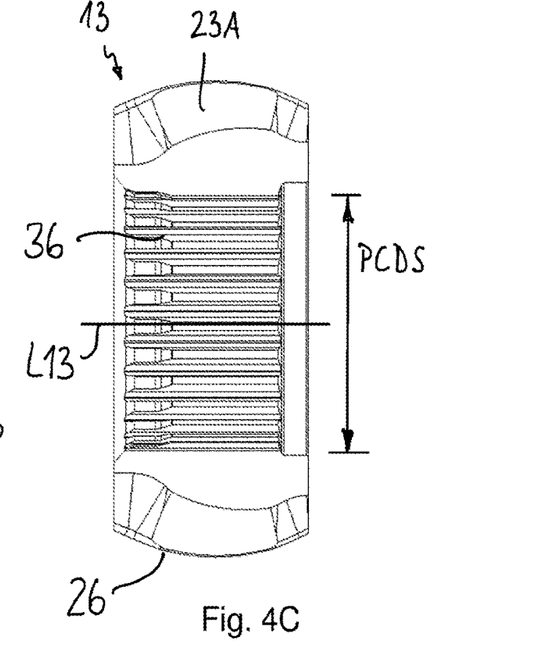
FIG. 4C shows the inner joint part of the first example counter track joint in a longitudinal section through a first inner ball track according to section line 4C-4C of FIG. 4B.
Figure 4D:
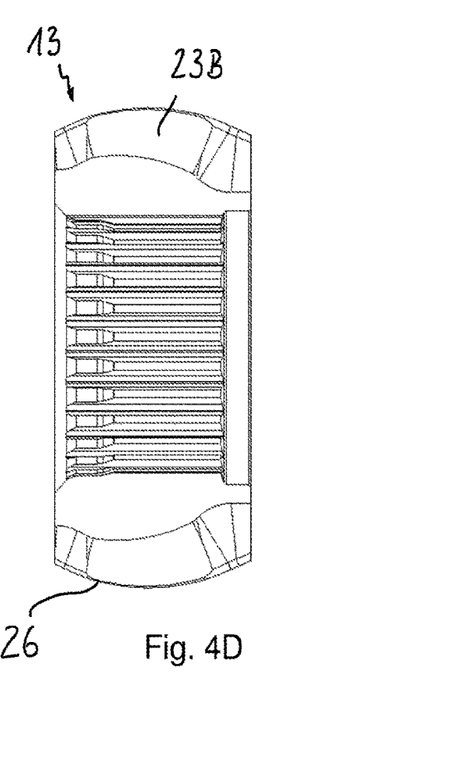
FIG. 4D shows the inner joint part of the first example counter track joint in a longitudinal section through a second inner ball track according to section line 4D-4D of FIG. 4B.

In the embodiment shown here, the inner face 24 of the outer joint part 12, the cage outer face 16, the cage inner face 17 and the outer face 26 of the inner joint part 13 are spherical. Alternatively or additionally, one or more of said faces may have cylindrical, toroidal and/or conical sections. With regard to the inner face 24 of the outer part 12, an opening-sided portion 24a, a central portion 24c and a base-sided portion 24b are shown in FIG. 3D. The base-sided portion 24b forms the support face against which the ball cage 15 can be axially supported with its outer face 16, for example when a shaft is pressed into the inner joint part 13 during mounting.

The outer joint part 12 has a base 19, which can, for example, merge into a connecting journal, and an opening 20. The inner joint part 13 has an opening 21, into which the journal of a drive shaft 30 can be inserted in a rotationally fixed manner to transmit a torque. A counter track joint 11 with mounted shaft 30 is shown in FIGS. 2A to 2D. The position of the base 19 hereinafter denotes the axial direction "towards the connection side", the position of the opening 20 hereinafter denotes the axial direction "towards the opening side". These terms are also used in relation to the inner joint part, disregarding the actual connection of a shaft to the inner joint part 13. It is understood that the outer joint part, instead of having a base, can also be open towards the connection side, for example in the form of a disc joint.

Figure 1A:
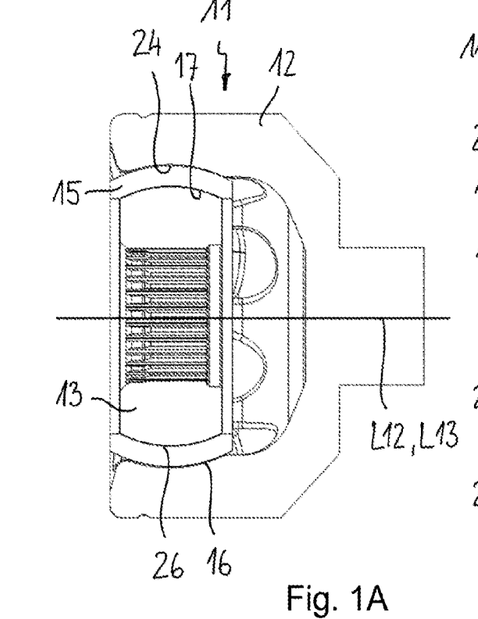
FIG. 1A shows a first example counter track joint in a longitudinal section through a web area.
Figure 1B:
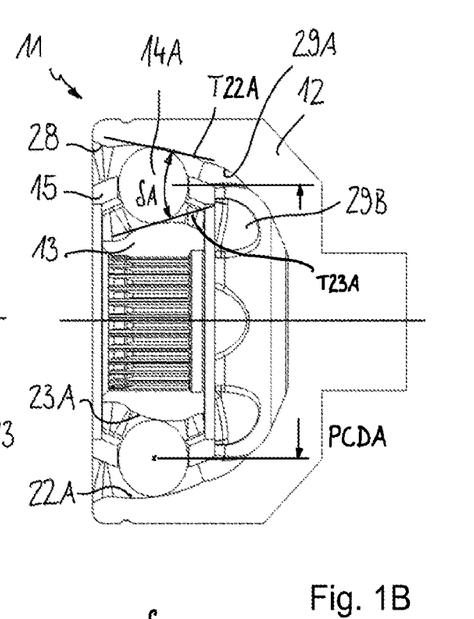
FIG. 1B shows the first example counter track joint in a longitudinal section through a first pair of tracks.
Figure 1C:
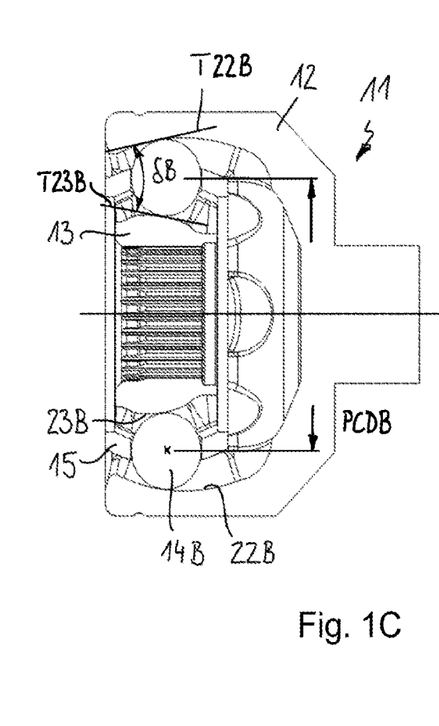
FIG. 1C shows the first example counter track joint in a longitudinal section through a second pair of tracks.

Alternating around the circumference are first pairs of tracks 22A, 23A with torque transmitting first balls 14A and second pairs of tracks 22B, 23B with torque transmitting second balls 14B. The shape of the first pair of tracks 22A, 23A is shown in FIG. 1B and the shape of the second pair of tracks 22B, 22B is shown in FIG. 1C. The first balls 14A are in contact with first outer ball tracks 22A in the outer joint part and first inner ball tracks 23A in the inner joint part. The centers of the first balls 14A define a first center line when moving along the outer and inner first ball tracks 22A, 23A respectively, while the centers of the second balls 14B define a second center line when moving along the outer and inner second ball tracks 22B, 23B respectively.

With the outer joint part 12 and inner joint part 13 aligned coaxially, the tangents T22A, T23A to the balls 14A in the contact points with the first tracks 22A, 23A form an opening angle δA that opens towards the opening side. The second balls 14B are guided in outer ball tracks 22B in the outer joint part 12 and inner ball tracks 23B in the inner joint part 13. The balls 14B are shown with contact in the track base of the ball tracks, which need not necessarily be given. In the straightened position shown, the tangents T22B, T23B to the second balls 14B in the contact points with the second tracks 22B, 23B form a second opening angle δB, which opens towards the connection side. In a modified track form of the counter track joint, the opening angles oriented in opposite axial directions can also occur in a slightly angled position of the joint of up to 2°.

The first and second pairs of tracks are located with their center lines respectively in a radial plane through the joint. A ball 14A, 14B is respectively received in a cage window 18 in the ball cage 15. The radial planes each have the same angular distance from each other. The number of torque-transmitting balls 14A, 14B and correspondingly the number of outer and inner ball tracks is eight, without being limited thereto. Each two first pairs of tracks 22A, 23A of the outer joint part 12 and the inner joint part 13 are respectively arranged diametrically opposite each other, and each two second pairs of tracks 22B, 23B are arranged diametrically opposite each other.

In the following, the special features of the counter track joint 11 according to the disclosure, including the design of the first and second ball tracks 22A, 22B of the outer joint part 12, and the design of the first and second ball tracks 23A, 23B of the inner joint part 13, which differ from each other, will be described in greater detail. The following definitions apply in connection with the counter track joint according to the disclosure:

The joint articulation angle β defines the angle included between the longitudinal axis L12 of the outer joint part 12 and the longitudinal axis L13 of the inner joint part 13. The joint articulation angle β is zero when the joint is straightened.

The track articulation angle β/2 defines the angle that is enclosed between a radius from the joint center M to the ball center and the joint center plane EM. In each angular position of the joint, the track articulation angle β/2 is always half of the joint articulation angle β.

The opening angle δ defines the angle enclosed by tangents T to the balls in the contact points with the first ball tracks and the second ball tracks, respectively, when the joint is straightened.

The control angle δ/2 defines the angle that a tangent applied to the respective ball center line in the center of the ball when the joint is straightened encloses with the corresponding longitudinal axis L of the outer or inner joint part. The opening angle δ/2 is equal to half the opening angle θ.

The center plane EM is defined by the ball centers of the torque transmitting balls 14A, 14B.

The first pitch circle diameter PCDA defines the diameter formed by the centers of the first balls 14A when the joint is straightened.

The second pitch circle diameter PCDB defines the diameter formed by the centers of the second balls 14B when the joint is straightened.

The pitch circle diameter PCDS defines the diameter of the insertion opening of the inner joint part 13, e.g., by tooth root lines of the insertion opening.

The counter track joint 11 shown here is preferably designed such that the joint parts 12, 13 are angularly movable relative to each other by an articulation angle β of up to a maximum of 30°. The ratio of the first and/or second pitch circle diameter PCDA, PCDB to the largest pitch circle diameter PCDS of the insertion opening of the inner joint part 13 is smaller than 2.05, i.e. PCDA/PCDS<2.05 and/or PCDB/PCDS<2.05, without being limited thereto. This design allows particularly high torques to be transmitted by the counter track joint 11. However, it is understood that, depending on the application, other designs with larger articulation angles β of more than 30°, or more than 45°, such as are used for example in wheel-side joints for steered axles, can also be provided.

According to the disclosure, the first and second outer ball tracks 22A, 22B, which may also be collectively referred to as outer ball tracks or outer ball track group, on the one hand, and the first and second inner ball tracks 23A, 23B, which may also be collectively referred to as inner ball tracks or inner ball track group, on the other hand, are produced differently.

Specifically, one of the outer ball track group and the inner ball track group can be hardened and hard-machined by a cutting process, while the other of the outer ball track group and the inner ball track group is soft finish machined, i.e. is not mechanically machined after hardening. The soft-finished and subsequently hardened ball tracks can be rougher than the ball tracks finish-machined after hardening.

An embodiment is described below in which the ball tracks 22A, 22B of the outer joint part 12 are soft finish machined before hardening, and the ball tracks 23A, 23B of the inner joint part 13 are hard finish machined after hardening.

The outer joint part 12 shown as a detail in FIGS. 3A to 3E, including the first and second outer ball tracks 22A, 22B thereof, may be made by forming operations, for example by forging, hot forming, cold forming, stamping and/or hammering. It is understood that intermediate machining steps may also be provided between individual forming steps, for example for over-turning and/or deburring.

Figure 1D:
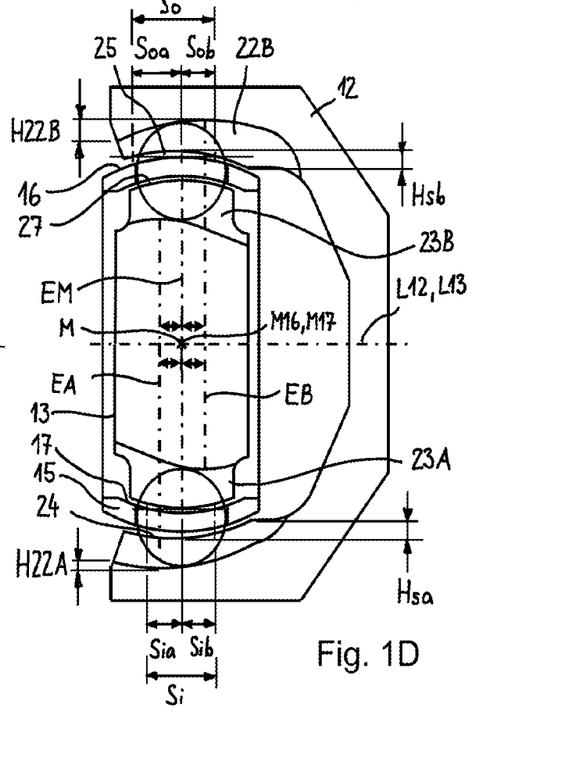
FIG. 1D shows the first example counter track joint in a longitudinal section in simplified representation with a first pair of tracks in the lower half of the figure, and a second pair of tracks in the upper half.
Figures 2A, 2B, 2C:
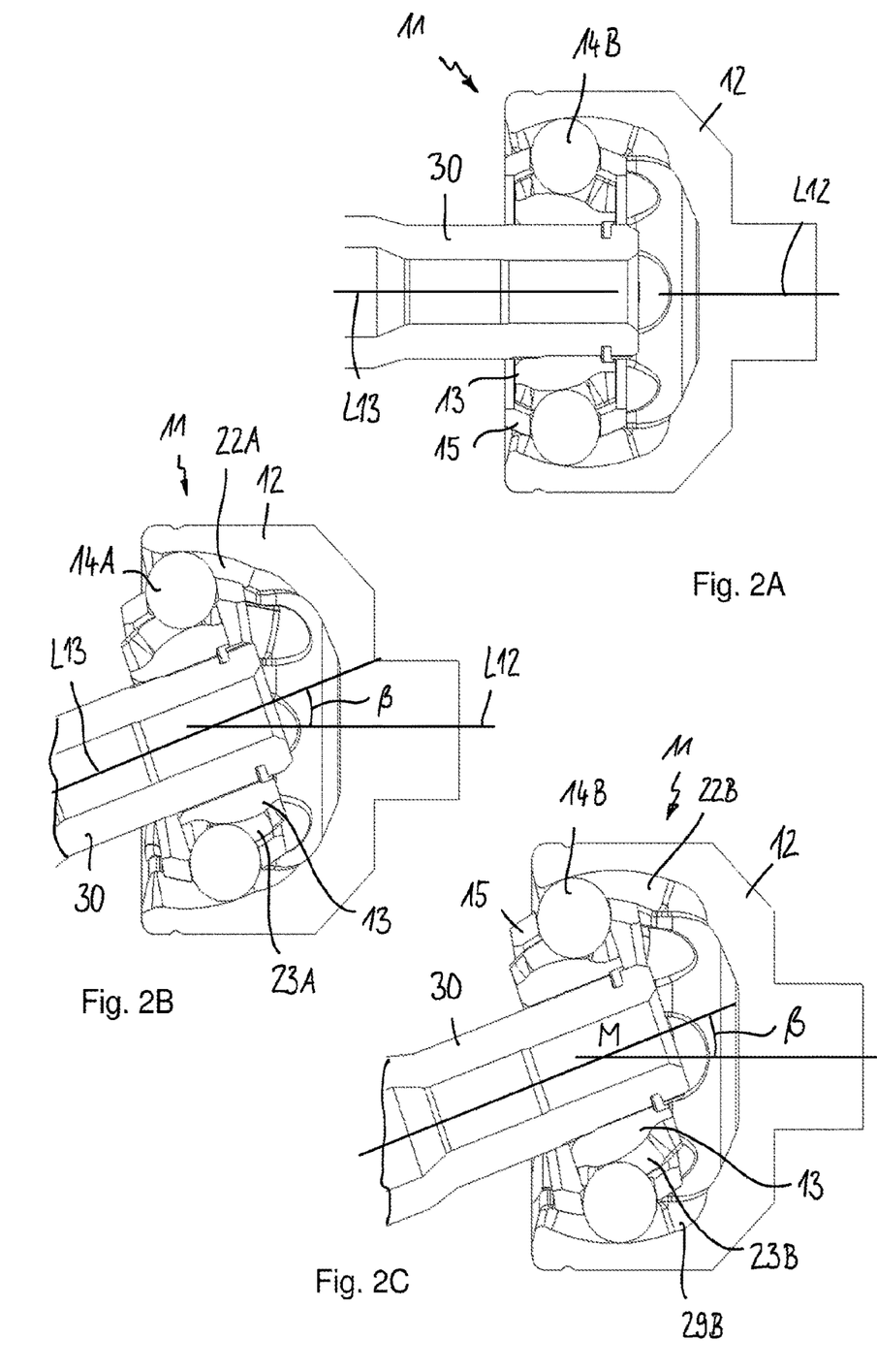
FIG. 2A shows the first example counter track joint with inserted shaft in coaxial alignment of the inner joint part and outer joint part.
FIG. 2B shows the first example counter track joint with inserted shaft in an articulated representation in a longitudinal section through a first pair of tracks.
FIG. 2C shows the first example counter track joint with inserted shaft in an articulated representation in a longitudinal section through a second pair of tracks.
Figures 2D, 3A, 3B:
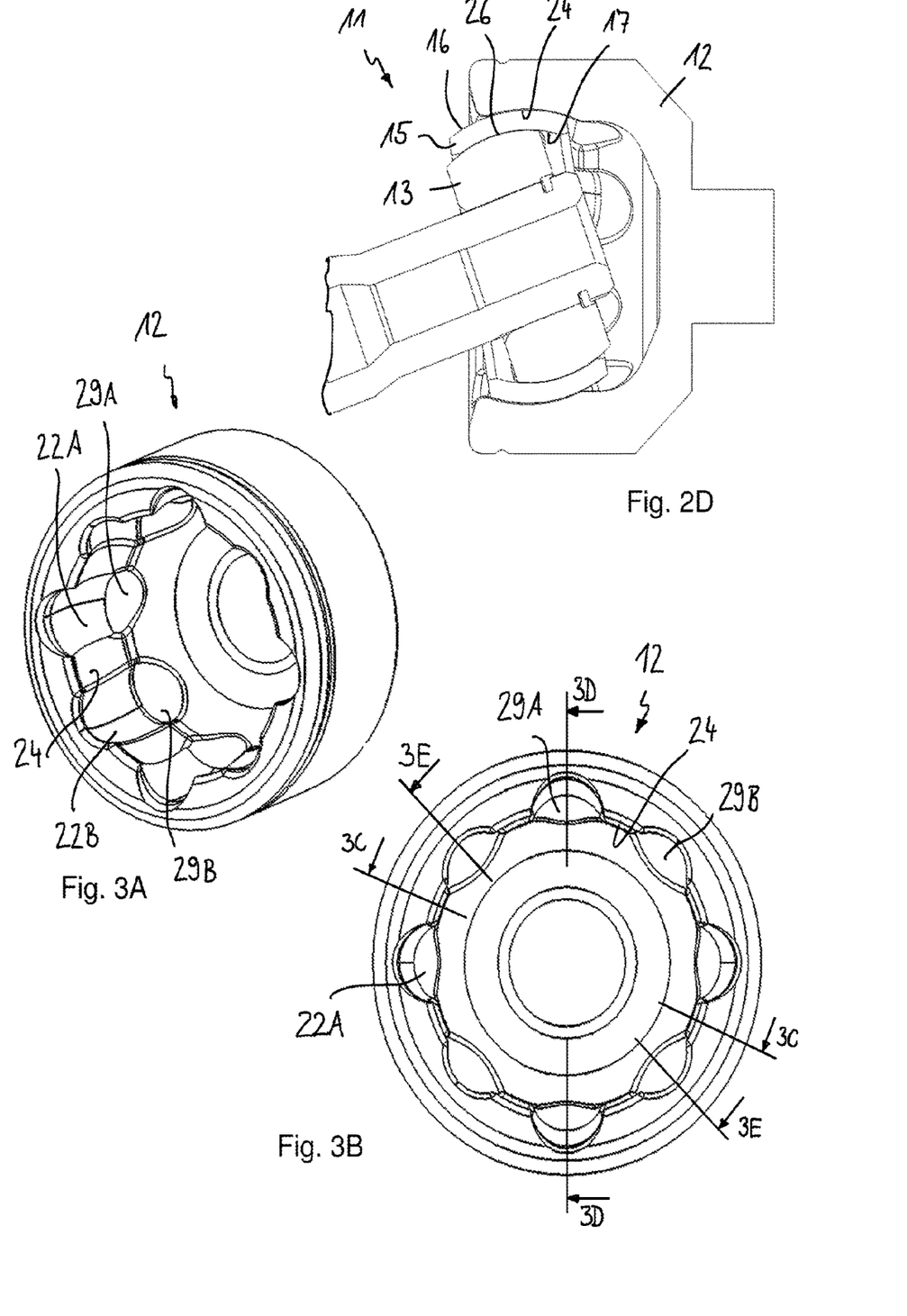
FIG. 2D shows the first example counter track joint with inserted shaft in an articulated representation in a longitudinal section through a web area.
FIG. 3A shows the outer joint part of the first example counter track joint in a three-dimensional representation on the joint opening.
FIG. 3B shows the outer joint part of the first example counter track joint in an axial view of the joint opening.
Figure 7A:
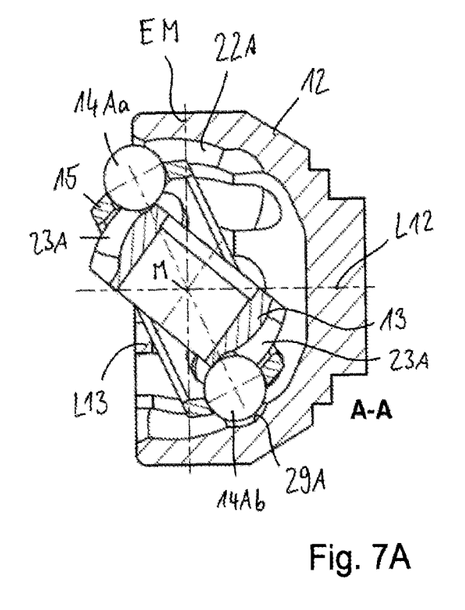
FIG. 7A shows the assembly of the balls with the inner joint part overflexed relative to the outer joint part in a longitudinal section through a first pair of tracks.

As can be seen from FIGS. 1B, 1D lower half of the FIGS. 2C and 3D, the first outer ball tracks 22A have an arcuate central functional section. The center of the arc generating the central functional section is offset from the center plane of the joint 11 towards the opening side, which is also referred to as the axial offset, with an offset plane EA. At their opening-side ends, the first outer ball tracks 22A of the outer joint part 12 have a radial widenings 28A to facilitate insertion of an associated ball 14A during assembly. Furthermore, the radial widening 28A of the first ball tracks 22A on the opening side reduces the radial undercut formed by the central functional section. This in turn has advantages in a forming production of the outer joint part 12, as less material has to flow radially inwards and/or be pressed during the forming process. At their base end, the first outer ball tracks 22A of the outer joint part 12 have a radially recessed pocket 29A relative to the functional track section. As shown in FIG. 7A, during assembly of a ball 14Aa being inserted on the opening side, the diametrically opposite ball 14Ab can enter the pocket 29A on the base side. This facilitates the assembly of the counter track joint 11.

Figure 7B:
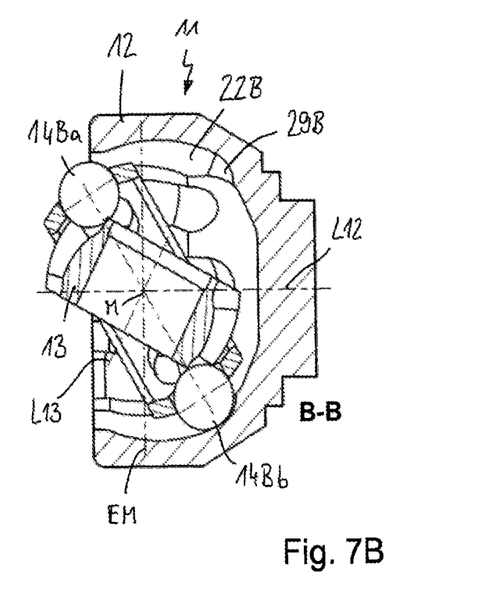
FIG. 7B shows the assembly of the balls with the inner joint part overflexed relative to the outer joint part in a longitudinal section through a second pair of tracks.

As can be seen from FIGS. 1C, 1D upper half, 2B and 3E, the second outer ball tracks 22B have an arcuate central functional section. The center of the arc generating the central functional section is offset to the base side into the plane EB with respect to the center plane EM of the joint 11. At their base end, the second outer ball tracks 22B of the outer joint part 12 have a pocket 29B radially recessed relative to the functional track section. As shown in FIG. 7B, during assembly of a ball 14Ba inserted on the opening side, the diametrically opposite ball 14Bb can enter the pocket 29B on the base side. This facilitates the assembly of the counter track joint 11.

The first outer ball tracks 22A form a first undercut H22A towards the opening side, and the second outer ball tracks 23B form a second undercut H22B towards the opening side. It can be seen in FIG. 1D that the first undercut H22A of the first ball tracks 22A opening towards the opening side is smaller than the second undercut H22B of the second ball tracks 22B opening towards the connection side.

In the present outer joint part 12, the spherical inner face 24 is preferably also soft finished, i.e. it remains mechanically unmachined after hardening. Thus, the entire inner contour of the outer joint part 12 with ball tracks 22A, 22B and sphere 24 is finished before hardening. After hardening, no further geometry-changing machining is provided. In this regard, it is convenient that the outer part inner face 24 together with the first and second outer ball tracks 22A, 22B are produced by forming operations, as described above. Forming operations offer the advantage of fast and cost-efficient manufacturing.

The first and second outer ball tracks 22A, 22B are formed such that a two-point contact with the associated ball 14A, 14B is formed in a cross-section through the respective ball track. A two-point contact can be created, for example, by a track shape that is gothic or elliptical in cross-section.

The production of the inner joint part 13, that is shown in detail in FIGS. 4A to 4D, including the first and second inner ball tracks 23A, 23B, can be carried out by machining processes such as turning and/or milling, although a production by means of forming operations is also possible. The inner ball tracks 23A, 23B may be prefabricated with appropriate allowances prior to hardening. After hardening, the inner ball tracks 23A, 23B are finish-machined to the desired final geometry. The finish machining can be performed by cutting processes, for example by grinding and/or turning operations. The first and second inner ball tracks 23A, 23B can be also designed such that in cross-section through the respective ball track a two-point contact is formed with the associated ball 14A, 14B.

In the present embodiment, the spherical outer face 26 of the inner joint part 13 is preferably also first soft pre-machined, then hardened and hard finished after hardening. The prefabrication can be carried out by machining processes, such as turning or milling, and/or by non-cutting manufacturing processes, such as forming or forging. The finish machining of the outer face 26 of the inner joint part can be carried out by chip-forming operations, for example by grinding.

Figures 6A, 6B, 6C:
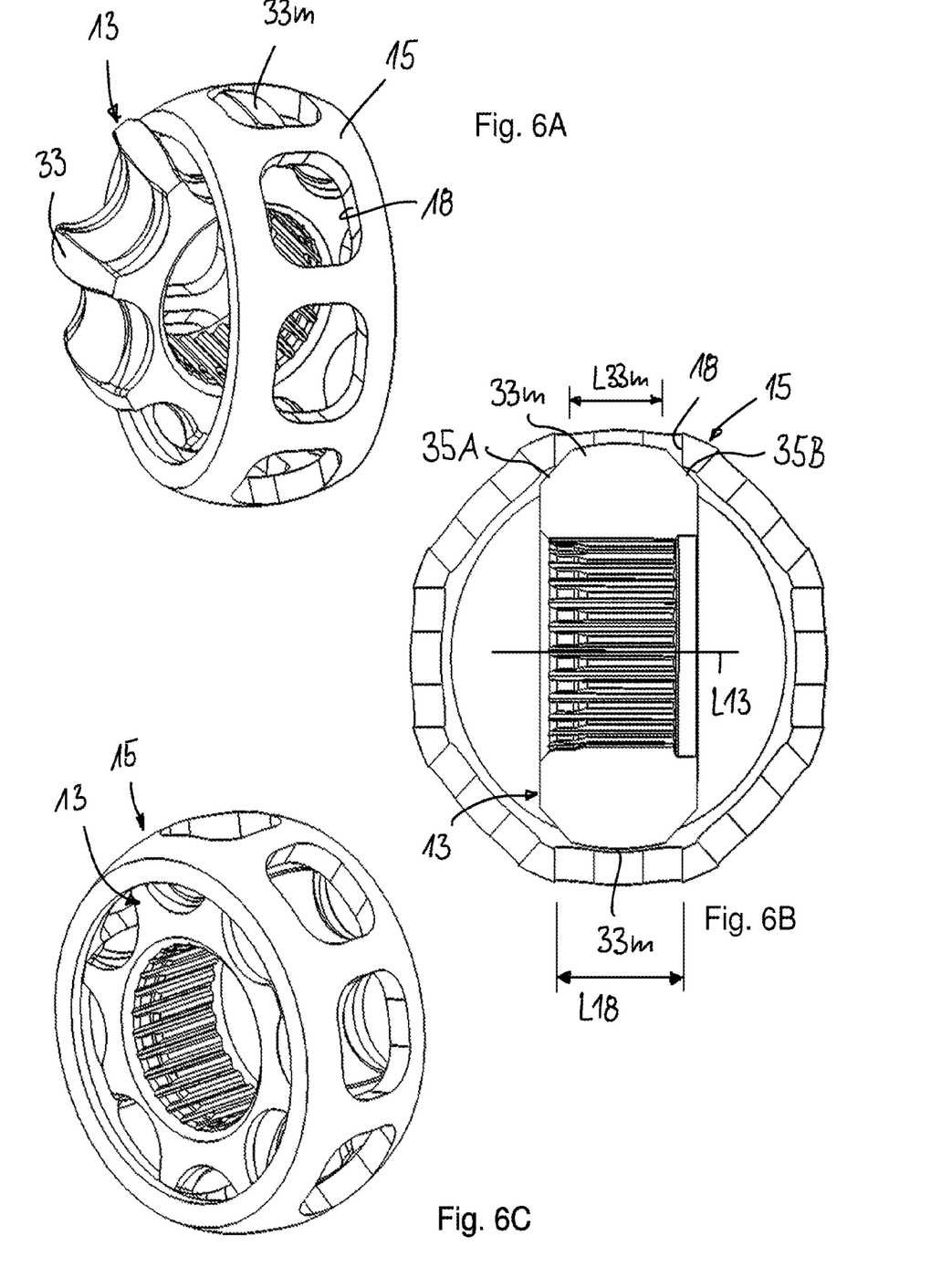
FIG. 6A shows the assembly of the inner joint part and the ball cage of the first example counter track joint of FIG. 1 when mounting the inner joint part into the ball cage with crossing axes in three-dimensional representation.
FIG. 6B shows the assembly of the inner joint part and the ball cage of the first example counter track joint of FIG. 1 during mounting according to FIG. 6A in a cross-section through the ball cage.
FIG. 6C shows the assembly of the inner joint part and the ball cage of the first example counter track joint of FIG. 1 after coaxial alignment of the inner joint part in the ball cage in a three-dimensional representation.

As can be seen in FIGS. 4A, 4B, 6A and 6B, in the present embodiment the inner joint part 13 has a plurality of circumferentially distributed webs 33, with two diametrically opposed webs 33$m$ having flattened areas (also referred to sometimes as axial recesses) on respective sides. The axial length L33$m$ of these webs 33$m$ is thus smaller than a smallest circumferential extension L18 of the cage windows 18, so that a web 33$m$ can be threaded into a window 18 of the ball cage 15 when the inner joint part 13 is aligned with its longitudinal axis L13 crossing with respect to the cage axis L15, as shown in FIGS. 6A and 6B.

Figure 5A:
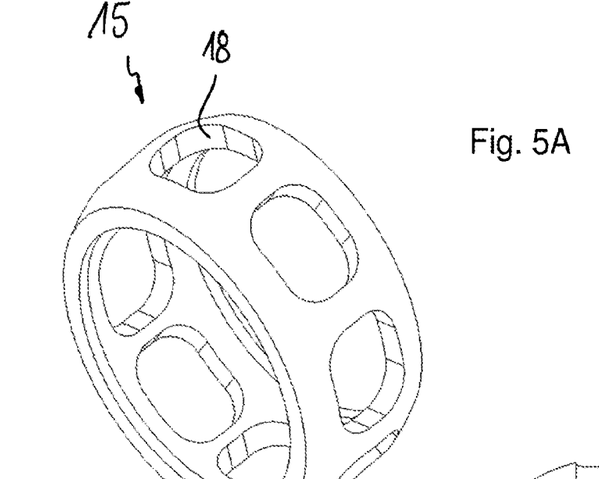
FIG. 5A shows the ball cage of the first example counter track joint in a three-dimensional representation.
Figure 5B:
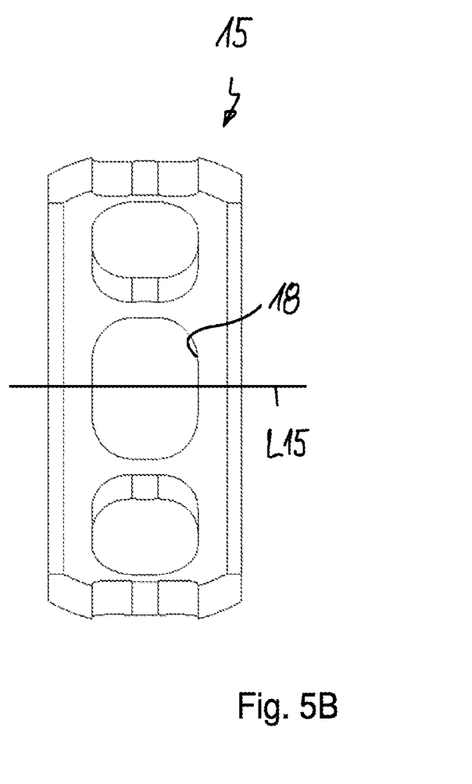
FIG. 5B shows the ball cage of the first example counter track joint in a cross-section.
Figure 5C:
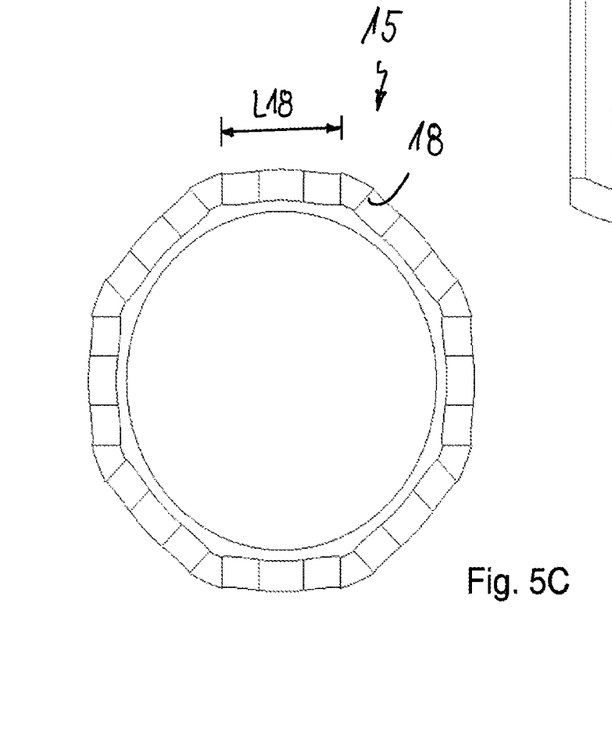
FIG. 5C shows the ball cage of the first example counter track joint in a longitudinal section through two opposing cage windows.

In the present embodiment, the ball cage 15, which is shown as a detail in Figures to 5C, has a soft-finished and subsequently hardened spherical outer face 16 and spherical inner face 17. The soft-finishing of the spherical faces 16, 17 can be effected in a cutting manner, for example by turning or grinding, and/or non-cutting, for example by forming. The side walls of the cage windows 18 guiding the balls 14A, 14B laterally can be hard-machined, e.g., ground, after hardening.

It can be seen FIG. 1D that the outer space 25 formed between the spherical outer face 16 of the ball cage 15 and the spherical inner face 24 of the outer joint part 12 is larger than the inner space 27 formed between the spherical inner face 17 of the ball cage 15 and the spherical outer face 26 of the inner joint part 13. Accordingly, an outer axial clearance between the ball cage 15 and the outer joint part 12 is greater than an inner axial clearance between the ball cage 15 and the inner joint part 13.

The spherical faces 24, 16, 17, 26 of the joint parts 12, 13, 15 are designed such that in the assembled state of the joint 11, in which the equator of the spherical face 26 of the outer joint part 12 and the equator of the spherical cage outer face 16 lie in one plane, and the equator of the spherical cage inner face 17 and the spherical face 26 of the inner joint part 13 lie in one plane, the outer radial space 25 is larger in the direction of the opening side than in the direction of the connection side. This allows the inner joint part 13 to be supported axially against the outer joint part 12 via the ball cage 15 when a shaft 30 is pressed in without the balls 14A, 14B jamming in the ball tracks 22A, 23A; 22B, 23B. In the present embodiment, the two spherical inner and outer faces 16, 17 of the ball cage 15 are arranged coaxially to each other.

A method according to the disclosure for manufacturing a counter track joint 11 comprises the steps: producing the outer joint part 12, producing the inner joint part 13, producing the ball cage 15, inserting the inner joint part 13 into the ball cage 15, inserting the ball cage 15 into the outer joint part 12, turning the inner joint part 13 relative to the outer joint part 12 such that the first inner ball tracks 23A are opposite the first outer ball tracks 22A and form first pairs of tracks opening towards the opening side of the outer joint part 12, and the second inner ball tracks 23B are opposite the second outer ball tracks 22B and form second pairs of tracks opening towards the connection side of the outer joint part 12; inserting the balls 14A, 14B into the cage windows 18 with the inner joint part and outer joint part angled relative to each other. The first pair of tracks and the second pair of tracks each receive one of the torque transmitting balls 14A, 14B, wherein with the longitudinal axes of the inner joint part and the outer joint part coaxially aligned, the balls are held by the ball cage on a joint center plane EM. It is provided that one of the outer ball track group and the inner ball track group are soft pre-machined, then hardened and after hardening finish machined in a cutting manner, and the other of the outer ball track group and the inner ball track group are soft finished and then hardened, that is, not further machined after hardening.

The cage outer face 16 of the ball cage 15 and the inner face 24 of the outer joint part 12, on the one hand, and the cage inner face 17 of the ball cage and the outer face 26 of the inner joint part 13, on the other hand, can be produced such that, in the assembled and straightened state of the counter track joint 11, the outer total axial clearance So between the ball cage 15 and the outer joint part 12 and the inner total axial clearance Si between the ball cage 15 and the inner joint part 13 are of different sizes. As shown in FIG. 1D, the outer total axial clearance So is divided asymmetrically being composed of the outer opening-sided axial clearance Soa and the connection-sided axial clearance Sob between cage 15 and outer part 12. Similarly, the inner total axial clearance Si is composed of the inner opening-sided axial clearance Sia and the connection-sided axial clearance Sib between cage 15 and inner part 13.

Figure 8:
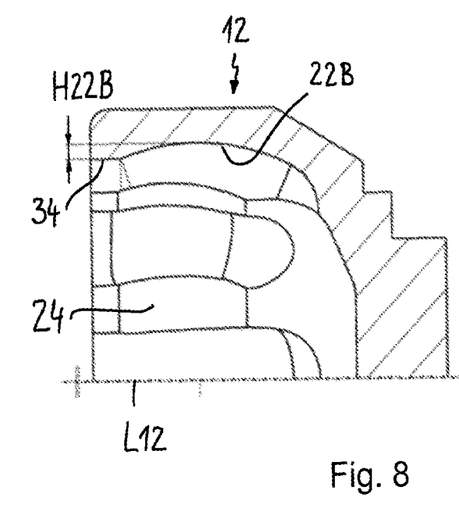
FIG. 8 shows another example outer joint part of a counter track joint according to the disclosure in a modified embodiment in a longitudinal half section.

FIG. 8 shows an outer joint part 12 in a modified embodiment, in which the second outer ball tracks 22B have a widening 34 at the opening-side end, so that the radial undercut H22B is reduced. In all other respects, the inner joint part 13 and all other joint details can be designed as described in connection with FIGS. 1A to 7B.

Figure 9:
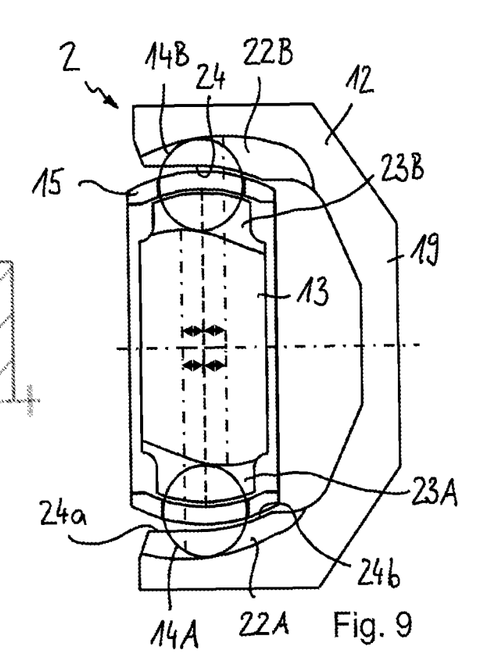
FIG. 9 shows an outer joint part of a further example counter track joint according to the disclosure in a longitudinal section.

FIG. 9 shows a counter track joint 11 according to the disclosure in a further modified embodiment. This widely corresponds to the embodiment shown in FIGS. 1A to 7B, the description of which is referred to as an abbreviation. The same and/or corresponding details are marked with the same reference signs. A first pair of webs 22A, 23A is shown in the lower half of the figure, and a second pair of webs 22B, 23B is shown in the upper half of the figure. The special feature of the present embodiment according to FIG. 9 is that the inner face 24 of the outer joint part 12 is cylindrical, starting from the central plane EM towards the opening side. In this respect, the opening-side portion 24a has no undercut. The base-side portion 24c of the inner face 24 forms the support face for the ball cage 15, as in the above embodiments.

LIST OF REFERENCE SIGNS 11 counter track joint
12 outer joint part
13 inner joint part
14A, 14B ball
15 ball cage
16 spherical outer face (15)
17 spherical inner face (15)
18 windows
19 connection side
20 opening page
21 opening
22 outer ball track
23 inner ball track
24 spherical inner face (12)
25 outer space
26 spherical outer face (13)
27 inner space
28 radial widening
29 pocket
30 shaft
32 web (12)
33 web (13)
34 widening
35B flattened areas
36 opening
L longitudinal axis
M joint center
EM joint center plane
T tangent
EA first offset plane
EB second offset plane
Si inner total axial clearance
So outer total axial clearance
PCD pitch circle diameter
β joint articulation angle
δ opening angle

The invention claimed is:

1. A counter track joint, comprising:
an outer joint part having a longitudinal axis, a connection side, and an opening side, as well as first outer ball tracks and second outer ball tracks circumferentially distributed in an inner face of the outer joint part, which are at least partially curved in a longitudinal section, and which form an outer ball track group;
an inner joint part having a longitudinal axis, and first inner ball tracks and second inner ball tracks circumferentially distributed in an outer face of the inner joint part, which are at least partially curved in longitudinal section, and which form an inner ball track group,
wherein the first outer ball tracks and the first inner ball tracks form first pairs of tracks which widen towards the opening side of the outer joint part, and the second outer ball tracks and the second inner ball tracks form second pairs of tracks which widen towards the connection side of the outer joint part;
a torque transmitting ball in each of the first pairs of tracks and in each of the second pairs of tracks; and
a ball cage arranged between the outer joint part and the inner joint part and comprising a cage inner face, a cage outer face and circumferentially distributed cage windows each receiving at least one of the torque-transmitting balls, wherein the balls are held by the ball cage in a joint centre plane when the longitudinal axes of the inner joint part and the outer joint part are aligned coaxially;
wherein the inner face of the outer joint part forms a support face towards the connection side, against which the ball cage can be axially supported,
wherein a first one of the outer ball track group and the inner ball track group is in a hardened and hard finished state, and
wherein a second one of the outer ball track group and the inner ball track group is in a soft finished and hardened state.

2. The counter track joint according to claim 1, wherein the second one of the outer ball track group and the inner ball track group is finished by chipless forming.

3. The counter track joint according to claim 1, wherein at least one of the cage outer face or the cage inner face is soft finished and hardened.

4. The counter track joint according to claim 1,
wherein, with the longitudinal axis of the outer joint part and the longitudinal axis of the inner joint part aligned with each other, an outer radial clearance formed between the cage outer face and the inner face of the outer joint part, and an inner radial clearance formed between the cage inner face and the outer face of the inner joint part, differ in size; and wherein, with the outer ball track group finish-machined before hardening, the outer radial clearance is larger than the inner radial clearance, and, with the inner ball track group finish-machined before hardening, the outer radial clearance is smaller than the inner radial clearance.

5. The counter track joint according to claim 1, wherein, with the outer joint part and the inner joint part coaxially aligned, an outer total axial clearance formed between the cage outer face and the inner face of the outer joint part and an inner total axial clearance formed between the cage inner face and the outer face of the inner joint part differ in size.

6. The counter track joint according to claim 5, wherein, with the inner joint part positioned with respect to the inner total axial clearance axially centrally to the ball cage, the outer total axial clearance is divided asymmetrically into an outer opening-sided axial clearance and an outer connection-sided axial clearance.

7. The counter track joint according to claim 1, wherein the first outer ball tracks have a first outer undercut on the opening side, and the second outer ball tracks have a second outer undercut on the opening side, the first outer undercut being smaller than the second outer undercut.

8. The counter track joint according to claim 1, wherein the first outer ball tracks and the second outer ball tracks of the outer joint part are soft finished and hardened, and wherein the first inner ball tracks and second inner ball tracks of the inner joint part are hardened and hard finished.

9. The counter track joint according to claim 8, wherein the inner face of the outer joint part is soft finished and hardened, and wherein the outer face of the inner joint part is hardened and hard finished after hardening.

10. The counter track joint according to claim 8, wherein the first outer ball tracks and the second outer ball tracks of the outer joint part are finish-machined by forming before hardening; and wherein the first inner ball tracks and the second inner ball tracks of the inner joint part are finish-machined after hardening.

11. The counter track joint according to claim 1, wherein the first outer ball tracks and the second outer ball tracks are configured such that, when viewed in cross-section, an outer two-point contact is formed with the associated torque-transmitting ball, and wherein the first inner ball tracks and the second inner ball tracks are configured such that, when viewed in cross-section, an inner two-point contact is formed with the associated torque-transmitting ball.

12. The counter track joint according to claim 1, wherein at least a partial number of the second outer ball tracks of the outer joint part have, on the connection side, a pocket which is radially recessed with respect to a functional portion and into which the respective ball is accommodated to enter radially when the joint is overflexed.

13. The counter track joint according to claim 1, wherein the outer face of the inner joint part is formed by a plurality of circumferentially distributed webs, a partial number of the webs having flattenings on both axial sides so that the axial length of the partial number of the webs is smaller than the circumferential extension of a cage window of the ball cage.

14. The counter track joint according to claim 1, wherein the outer joint part and the inner joint part are configured such that the inner joint part is angularly movable relative to the outer joint part by an articulation angle of up to a maximum of 30°; and wherein the first balls of the first pair of tracks form a first pitch circle diameter, and the second balls of the second pair of tracks form a second pitch circle diameter, wherein a ratio of at least one of the first and second pitch diameters to the largest pitch diameter of an insertion opening of the inner joint part is less than 2.05.

15. A method of producing a counter track joint, comprising:
producing an outer joint part with a longitudinal axis, a connection side and an opening side, an inner face with a supporting face axially effective towards the connection side, and with first outer ball tracks and second outer ball tracks forming an outer ball track group;
producing an inner joint part with a longitudinal axis, an outer face, and first inner ball tracks and second inner ball tracks forming an inner ball track group;
producing a ball cage with a cage axis, an cage inner face, a cage outer face and cage windows circumferentially distributed about the cage axis;
inserting the inner joint part into the ball cage;
inserting the ball cage into the outer joint part;
turning the inner joint part relative to the outer joint part such that the first inner ball tracks are opposite the first outer ball tracks and form first pairs of tracks which widen towards the opening side of the outer joint part, and the second inner ball tracks are opposite the second outer ball tracks and form second pairs of tracks which widen towards the connection side of the outer joint part;
inserting balls into the cage windows with the inner joint part and outer joint part overflexed relative to each other, with the first pairs of tracks and the second pairs of tracks each receiving one of the torque-transmitting balls, wherein the balls are held by the ball cage on a joint centre plane when the longitudinal axes of the inner joint part and the outer joint part are aligned coaxially;
wherein one of the outer ball track group and the inner ball track group is pre-machined soft, then hardened and hard finished after hardening; and
wherein the other one of the outer ball track group and the inner ball track group is soft finish-machined and then hardened, i.e. remains mechanically unmachined after hardening.

16. The method according to claim 15, wherein at least one of the cage outer face and the cage inner face is soft-finished and then hardened.

17. The method according to claim 15, wherein the first outer ball tracks, the second outer ball tracks and the inner face of the outer joint part are soft finished, and thereafter the first outer ball tracks and the second outer ball tracks of the outer joint part are hardened, and, wherein the first inner ball tracks, the second inner ball tracks and the outer face of the inner joint part are soft pre-machined, thereafter hardened, and thereafter hard finished.

18. The method according to claim 15, wherein the cage outer face and the inner face of the outer joint part on the one hand, and the cage inner face and the outer face of the inner joint part on the other hand, are produced such that in assembled and straightened state of the counter track joint an outer radial clearance between the ball cage and the outer joint part and an inner radial clearance between the ball cage and the inner joint part are different in size, respectively, and wherein an outer axial clearance between the ball cage and the outer joint part and an inner axial clearance between the ball cage and the inner joint part are different in size.

19. The method according to claim 15, wherein a partial number of webs of the inner joint part are produced with flattenings on both sides, so that mounting into a cage window of the ball cage for assembly is facilitated, and wherein at least a partial number of the first outer ball tracks of the outer joint part is produced on the connection side with a pocket which is radially recessed with respect to a functional portion and into which the associated ball can enter radially when the joint is overflexed.

* * * * *